United States Patent Office 3,542,895
Patented Nov. 24, 1970

3,542,895
PROCESS FOR PRODUCING ETHYLENE
AND CATALYST THEREFOR
James P. Russell, Berkeley Heights, N.J., assignor to Air
Reduction Company, Incorporated, New York, N.Y., a
corporation of New York
No Drawing. Filed June 26, 1968, Ser. No. 740,035
Int. Cl. C07c 11/04, 17/10
U.S. Cl. 260—683.3
10 Claims

ABSTRACT OF THE DISCLOSURE

A catalyst composed of a mixture of rare-earth chlorides, copper chloride, and at least one alkali metal halide, in combination with zirconium oxide, is effective for use in a process wherein ethane is converted to ethylene by reacting a gaseous mixture of ethane, oxygen, and a chlorine source in the presence of the catalyst.

---

This invention relates to the conversion of ethane to ethylene, and minor amounts of valuable byproducts e.g. vinyl chloride, and chloroethanes which are readily convertible to ethylene and vinyl chloride.

It is an object of this invention to provide novel catalysts for the dehydrochlorination of ethane, as well as novel processes for the conversion of ethane to ethylene.

Other and further objects will appear to those skilled in the art from the following description of the invention.

Briefly, in accordance with the process of this invention, ethylene is produced by forming a gaseous mixture of ethane, oxygen, and a chlorine source and contacting this mixture with a bed of the novel catalyst of this invention consisting essentially of a mixture of rare-earth chlorides, a copper chloride, and at least one of certain alkali-metal halides, in combination with zirconium oxide, suitably present as a support or carrier.

The reactions involved in the process of this invention may be illustrated by the following equation:

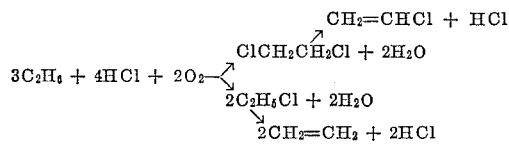

The rare earth chlorides provide for a high usage of the chloride source, namely chlorine, hydrogen chloride, or a combination thereof, primarily ethylene. A wide variety of rare-earth metals can be used in the catalysts of this invention. The rare-earth chlorides used need not be the chlorides of a single rare earth metal, and it has been found advantageous to utilize a combination of rare-earth metals. For example, the chlorides of "Mischmetal" are desirably used in the practice of this invention. The "Mischmetal" chlorides have a relatively constant composition which averages 50% cerium, 25% lanthanum, 20% neodymium, and 1% samarium. It will be understood that other rare-earth metals can also be used in the practice of this invention and that the percentages of the foregoing rare-earth metals will be correspondingly lower in the mixture.

The catalyst also contains a copper chloride. Mixtures of copper chlorides can be used, and it is preferred in the practice of this invention to use cupric chloride. The copper chloride used can contain small quantities of impurities, but it is preferred to utilize pure or commercially pure copper chloride.

The catalyst further contains alkali-metal halides, desirably the fluorides or chlorides. These alkali-metal halides appear to improve the process by lowering or entirely obviating the loss of copper from the catalyst. The effect of sodium halides is in most instances inferior to that of the salts of the other alkali metals and for that reason the halides of the alkali metals other than sodium are preferred. In many instances it is preferred to use a substantially sodium-free catalyst. Lithium, cesium, and potassium halides are desirably used in the practice of the present process. Due to its outstanding ability to obviate the loss of copper from the catalysts, potassium fluoride is an outstanding alkali-metal halide. The preferred alkali-metal salt is cesium chloride because of good conversions obtained therewith.

The best yields of ethylene are generally obtained when the basal catalyst contains from about 30% to about 50% cupric chloride, from about 25% to about 50% of alkali-metal halide, and from about 25% to about 50% of rare-earth metal chloride. It is preferred that the basal catalysts of this invention contain about equimolar proportions of copper chloride, rare earth metal chloride, and alkali-metal chloride. Unless otherwise indicated, all parts, percentages, proportions, and ratios herein are on a weight basis.

In accordance with the present invention, it is essential that the foregoing basal catalysts be associated with zirconium oxide, most advantageously by being deposited and said zirconium oxide which thus also functions as a solid carrier or support. It is preferred that the zirconium oxide have a relatively low surface area, i.e. a surface area less than 1 square meter per gram.

In fluidized solids reaction systems it is essential that the zirconium oxide comprise a range of particle sizes so that the fluidized bed is free from "slugging" and "bubbling." Slugging is a phenomenon wherein particles agglomerate into a mass or balls which fluidize only reluctantly or not at all, and bubbling is a phenomenon wherein masses of the reaction gas pass rapidly upwardly through the catalyst bed without intimately contacting the particulate solids. It has been found especially preferable that the catalyst be carried on zirconium oxide particles which will pass through 80-mesh and be caught on 200-mesh screen. It has been discovered that superior selectivity and yields are obtained when the reaction is carried out in a fluidized bed of catalyst and accordingly it is preferred to carry out the process of this invention in fluidized solids systems.

Regardless of whether fixed or fluidized beds of catalyst are to be used, relatively light loadings of the combination of rare-earth chlorides, copper chloride, and alkali metal halides in relation to the zirconium oxide should be used. As used herein, the term "loading" denotes the amount of the specific combination of halides catalyst which is present in relation to the zirconium oxide. It has been found that fixed bed catalyst systems can contain higher loadings than fluidized solids reaction systems. While fixed bed catalyst loadings of from 1% to as high as 20% can be used, it is generally preferred that the amount be in the lower portion of this range. For use in fluidized beds, it has been discovered that loadings on the order of from about 0.1% to about 5% should be used. With the mixed halide-zirconium oxide catalysts of this invention in fluidized solids operations, loadings of 0.2% to 4% have been found to be highly preferable.

It has been found that the ratio of ethylene to other useful products and the ratio of ethylene, vinyl chloride, ethyl chloride, and dichloroethane to less desirable products can be controlled by varying the process parameters, as hereinafter disclosed. Thus, the process of this invention can be conducted to provide desired high yields of useful products, while at the same time maintaining the ratio of these useful products to less desirable products, such as trichloroethane and chloromethanes, sufficiently high so that the overall efficiency of the process in the production of useful products provides for economical production, smaller equipment sizes, and fewer handling problems.

The temperatures used in carrying out the process of this invention can vary from about 400° C. to about 600° C. At temperatures below about 400° C. little or no unsaturated materials are formed, while at high temperatures over 600° C. the reactants begin to break down to tars, resins, and the like or to be completely oxidized. Generally, temperatures in the range of from about 425° C. to about 525° C. utilize 90% or more of the chlorine-supplying material and thus obviate the necessity for recovering large quantities of such materials from the process stream. Accordingly 425° C. to 525° C. is the preferred temperature range for the conduct of the process of this invention.

As stated above, the hydrocarbon feed material for use in the practice of this invention is ethane. Pure ethane is preferably used in the practice of the process, although it can contain minor amounts of other materials such as chlorinated ethanes. Under some conditions of operation the presence of ethyl chloride can be beneficial.

The chlorine-supplying material used in the practice of this invention can be chlorine gas or hydrogen chloride. It will be understood that a mixture of these two chlorine-supplying agents can also be used. When, as disclosed below, the reaction mixture contains water vapor as a diluent, the hydrogen chloride can, if desired, be supplied to the reaction mixture at least in part by vaporizing hydrochloric acid.

Oxygen is required in the process of this invention, and it is preferably supplied together with an inert diluent so as to provide better control of the reaction. Suitable inert diluents for use in the practice of the process are inert or noble gases such as nitrogen, argon, and the like or vaporized inert materials such as steam. While nitrogen is a very satisfactory inert diluent, the use of steam is greatly preferred in certain embodiments of this invention because its relatively high heat capacity provides good temperature control in the reaction gases. Moreover, the steam can be relatively easily removed from the product stream by condensation and accordingly somewhat simplifies the recovery of ethylene and the other useful products from the reaction stream. It is generally preferred to mix the oxygen with sufficient inert diluent so that the oxygen comprises about 25% by volume of the oxygen-diluent mixture. It will be understood that air is a suitable source of oxygen for use in the practice of this process.

The reaction mixture fed to the process can contain varying proportions of ethane, oxygen (with inert diluent), and chlorine-supplying material. Amounts of the chlorine-supplying material beyond the stoichiometric tend to increase the amount of undesirable higher chlorinated materials formed in the process. Excessively large amounts of oxygen supplied to the process may have a tendency to oxidize the feed materials and the products formed in the reaction. Accordingly, it is preferred to have from about 10% to about 30% by volume of excess ethane fed to the process. The amounts of oxygen and the chlorine-supplying material fed to the process vary according to whether hydrogen chloride, chlorine, or a mixture of the two is used. When hydrogen chloride is utilized it is preferred to use about one molar proportion of oxygen and one molar proportion of hydrochloric acid to between 1.1 and 1.3 molar proportions of ethane, and when chlorine is used, to utilize three molar proportions of oxygen and two molar proportions of chlorine to about 4.5 to about 6.5 parts of ethane. It has further been surprisingly found that when an excess of ethane is used, the amount of $CO_2$ produced by a by-product is actually diminished to as little as one-quarter of the amount formed as compared to the case where the ethane is used in the stoichiometric proportion.

The gas flow rates across the catalyst during the process can be varied over a range. As used herein, gas flow rates are expressed in terms of "space velocity" which is the volume per hour of gaseous feed introduced into a given volume of catalyst, both volumes being expressed in the same units. Space velocities of from about 700 to about 1500 are desirably used in practicing this process. Space velocities ranging from about 950 to 1150 are used when chlorine is the chlorine-supplying material, and space velocities of about 1000 to 1500 are used when hydrogen chloride is the chlorine-supplying material.

The reaction can be carried out over pressures ranging from sub- to superatmospheric. It is generally preferred that the reaction be run at atmospheric or superatmospheric pressures of at most about 4 atmospheres. For a given set of conditions the reaction can be run at lower pressures when chlorine is the chlorine-supplying material than when hydrogen chloride is utilized for this purpose.

It has been found in some instances, especially when a fixed-bed catalyst system is used, that better results can be obtained by preheating the gaseous mixture which is fed to the catalyst-containing zone. The preheating permits closer control of temperature in the reaction zone and the avoidance of hot spots in the fixed catalyst bed. Hot spots are not so readily formed in a fluidized solids catalyst bed because of the improved heat transfer which takes place in such systems.

After completion of the reaction the ethylene, and desirably the other useful products, are recovered from the gaseous effluent. Such a recovery can be carried out in a variety of ways, and the particular recovery processes used will depend to some extent on the composition of the effluent from the reaction and on the desired disposition of the several useful materials formed in the reaction.

The hydrogen chloride which remains in the mixture at the end of the reaction is desirably removed by scrubbing the gaseous effluent with water. Other aqueous solutions can be used for the scrubbing operation and if the quantity of hydrogen chloride remaining in the effluent be very small, a material such as aqueous sodium hydroxide or other alkali can be used to scrub the stream and remove and neutralize the hydrogen chloride. It is preferred to recover the hydrogen chloride for recycle to the process.

As to the organic materials remaining in the effluent after the hydrogen chloride is removed, they can be separated by cooling or compression to remove the less volatile constituents, they can be extracted or extractively distilled with suitable solvents to effect a separation, or they can be separated by absorption or fractionation and the like. Where a sharp separation between closely similar products is required, as for example where an exact analysis is important, chromatographic techniques can be utilized. Gas chromatographic techniques are especially helpful in resolving the components of the reaction product mixture.

The following example will serve to illustrate some preferred embodiments of this invention. It will be understood that this example is merely illustrative and the scope of this invention is defined only by the claims appended hereto.

EXAMPLE I

The reactor used for this experiment is a 45-inch high, 2-inch outside diameter Pyrex tube fitted at the bottom with a Pyrex ballcheck to act as a gas inlet jet. On top of the reactor tube is a cyclone type gas-solids separator having a solids return line communicating with a side-arm two inches from the bottom of the reactor tube. The lower two feet of the reactor is heated by a 2300-watt tube furnace controlled by a thermocouple-activated temperature controller. The gas take-off line from the cyclone passes to a water-cooled condenser for the collection of any condensable vapors, a second condenser to insure minimum carry-over of condensable vapors, two counter-current water scrubbers alternately used to absorb any hydrogen chloride, bleed lines to remove samples for analyses, a caustic scrubber to remove any last traces of acid gases from the stream, and a wet test meter to measure effluent gas volume.

The catalyst is prepared by measuring out 500 cc. of close-packed 100–300 mesh zirconium oxide particles, transferring said particles to an evaporating dish and impregnating them with a catalyst solution prepared by mixing 34 g. of $CuCl_2 \cdot 2H_2O$ in 150 cc. of water and adding similar amounts of cesium chloride and rare earth chloride and rare earth chlorides. The rare earth chlorides are a mixture known as Mischmetal chlorides which contain about 50% cerium, 25% lanthanum, 20% neodymium, 4% praseodymium, and 1% samarium. The catalyst mixture is then heated on a steam bath with stirring until it is almost dry, inserted to a porcelain pan, and heated for four hours in a forced air oven at 500° F. The heated catalyst is passed through an 80-mesh screen to remove or break up any aggregated particles. The resultant catalyst was diluted with additional uncoated zirconium oxide particles in such an amount that the resultant mixture contained 4.0% of the basal Cu-, rare-earth and Ce-chloride catalyst.

The reactor tube is charged with 500 cc. of this catalyst and a stream of dry nitrogen is passed therethrough for one minute at a flow rate high enough to expand the bed. Heat is then applied to the reactor tube and a stream of air passed through the bed at a space velocity of 500 liters/liter/hour. When the reactor reaches the desired temperature of 425° C., a mixture of equimolar parts of oxygen (supplied as air), ethane, and hydrogen chloride are fed into the reactor at a space velocity of 1050 liters/liter/hour. After the system is run for one hour, the gases are sampled and analyzed to determine their composition. After two consecutive gas samples show no significant change in composition, a one-hour metered sample is started, and 3 gas samples are taken and analyzed during the sample period. During the one-hour test period, total effluent from the system is measured on the wet test meter.

At the end of the experiment the reactor is shut down by first cutting off the hydrocarbon feed and then the chlorine-source feed and allowing air to run through the reactor for 15 minutes before shutting off the heater. The reactor is then cooled with a stream of air at a rate high enough to keep the bed expanded, and when the temperature falls below 200° C., the air flow is shut off.

The scrubber effluent after the hydrogen chloride has been removed is analyzed via gas chromatography by first separating the chlorinated organic materials in a silica gel column at 75° C. with 50 cc./min. of helium carrier gas. The chlorinated hydrocarbons are then resolved in a column containing 30% UCON LB 550X polyethylene glycol on Chromosorb P particulate substrate. A manual temperature control program is used starting at 100° C. and moving through 150° C. up to 185° C. at the end of 12 minutes. After 30 minutes all of the chlorinated hydrocarbons up to the tetrachloroethanes are eluted.

Under these conditions a yield of 34.68% ethylene, 2.45% vinyl chloride, 27.34% ethyl chloride, and 1.22% dichloroethane is recovered. Based upon the conversion of ethane, a yield of 48.08% ethylene, 3.42% vinyl chloride, 34.16% ethyl chloride, and 10.08% dichloroethane are obtained.

What is claimed is:

1. A process for the production of ethylene which comprises forming a gaseous mixture of ethane, oxygen, and a chlorine-supplying material selected from the group consisting of hydrogen chloride and chlorine and contacting the mixture with a catalyst containing rare earth chlorides, a copper chloride, and a substantially sodium-free alkali-metal halide, in combination with zirconium oxide, at a temperature of from about 400° C. to about 600° C. to form ethylene.

2. The process of claim 1, wherein the temperature is in the range of from about 425° to about 525° C.

3. A process for the production of ethylene which comprises introducing ethane, oxygen, and a chlorine source selected from the group consisting of chlorine and hydrogen chlorile into a fluidized catalyst zone containing a basal catalyst comprising rare earth chlorides, a copper chloride, and a substantially sodium-free alkali metal halide, said catalyst being deposited on a low surface area zirconium oxide.

4. A process as defined in claim 3, wherein the temperature is in the range of from about 400° to 600° C.

5. The process of claim 1 wherein the catalyst consists essentially of 2% to 4% of the basal catalyst components and 96% to 98% of zirconium oxide.

6. The process of claim 3, wherein the gaseous mixture of reactants is passed through the fluidized catalyst zone at a space velocity of from about 700 to about 1500 liters/liter of catalyst/hour.

7. A catalyst for the production of ethylene from ethane which comprises a basal catalyst mixture of rare earth chlorides, a copper chloride, anl a substantially sodium-free alkali-metal halide, in comibnation with zirconium oxide.

8. The catalyst of claim 7, wherein the basal catalyst mixture is from about 1% to about 20% of the catalyst.

9. The catalyst of claim 7, wherein the basal catalyst mixture is from 2% to 4% of the catalyst.

10. The catalyst of claim 7, wherein the amount of rare earth chlorides, the amount of copper chloride, and the amount of alkali-metal halide are substantially equimolar.

References Cited

UNITED STATES PATENTS

| | | | |
|---|---|---|---|
| 2,337,421 | 12/1943 | Spence et al. | 252—462 X |
| 3,205,280 | 9/1965 | Wattimena et al. | 260—680 |
| 3,217,064 | 11/1965 | McGreevy et al. | 260—683.3 |
| 3,267,161 | 8/1966 | Ukaji et al. | 260—659 |
| 3,483,136 | 12/1969 | Van der Plas et al. | 252—441 |

DELBERT E. GANTZ, Primary Examiner

G. E. SCHMITKONS, Assistant Examiner

U.S. Cl. X.R.

252—462; 260—656, 662

UNITED STATES PATENT OFFICE
CERTIFICATE OF CORRECTION

Patent No. 3,542,895   Dated November 24, 1970

Inventor(s) James P. Russell

It is certified that error appears in the above-identified patent and that said Letters Patent are hereby corrected as shown below:

Col. 5, lines 8 and 9, "and rare earth chloride" should be deleted;

line 59, "1.22%" should read -- 7.22% --.

Col. 6, line 19, "chlorile" should read -- chloride --;

line 35, "anl" should read -- and --;

line 36, "comibnation" should read -- combination --

Signed and sealed this 30th day of March 1971.

(SEAL)
Attest:

EDWARD M. FLETCHER, JR.
Attesting Officer

WILLIAM E. SCHUYLER, JR.
Commissioner of Patents